UNITED STATES PATENT OFFICE.

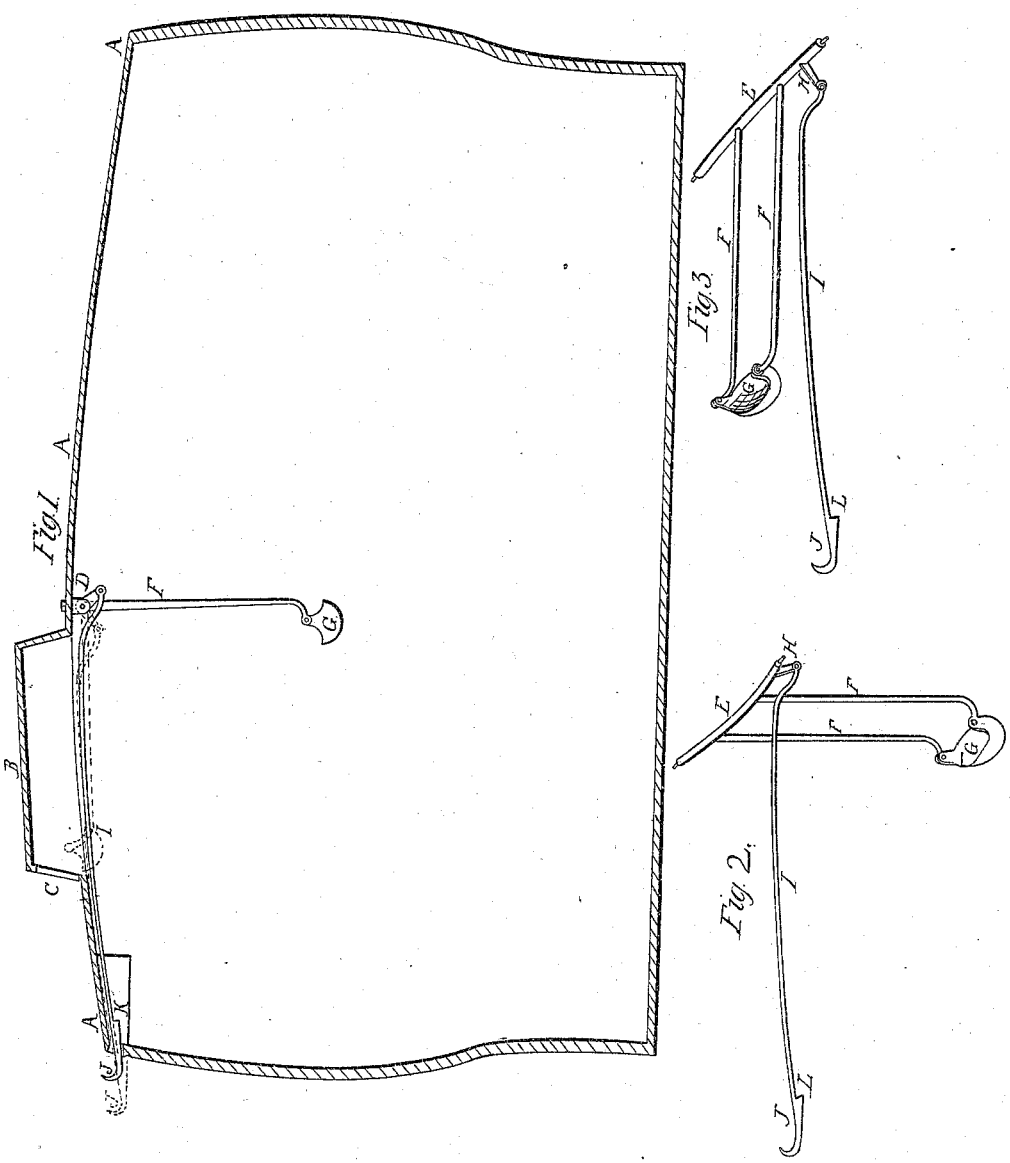

JOSEPH T. CURTIS, OF NEW YORK, N. Y.

OMNIBUS-COFFER.

Specification of Letters Patent No. 17,206, dated May 5, 1857.

*To all whom it may concern:*

Be it known that I, JOSEPH T. CURTIS, of New York, N. Y., have invented certain new and useful Improvements in Omnibus-Coffers, and that the following is a description of my improved mechanical mode of transmitting fare or passage money in omnibuses and other vehicles, reference being hereby had to the accompanying drawings as making part of this specification.

Figure 1 represents a vertical section of an ordinary omnibus, (A, A, A, B), with the apparatus, or mechanical coffer, applied, (D, E, F, G, H, I, J). Fig. 2 is a perspective view of the coffer, when lowered for use, and Fig. 3 a similar view of the same, when raised within reach of the driver.

This mechanism, which I construct preferably of metal, consists of a shaft E, (Figs. 1, 2, 3) placed transversely in the top of the vehicle, between the gudgeons, D, D, fastened to the roof (one of which gudgeons is represented in Fig. 1). Also, of the two bars or rods F, F, (Figs. 1, 2, 3,) springing out of the shaft E, and supporting at their other extremities a coffer of convenient form, G, (Figs. 1, 2, 3) playing on pivots, as depicted in the drawing. Also, of the short crank H (Figs. 2, 3) to which is attached, by a joint, the long rod I, J, L, (Figs. 2, 3,) which, when the apparatus is applied, passes forward through the small slit (or slot) K (Fig. 1) in the front of the vehicle and emerges at J (Fig. 1) at the side of the driver, where it has a spur L and terminates in a handle.

Now the operation of this apparatus is as follows: Supposing the coffer raised to a level, as represented in Fig. 3, or by the red lines, in Fig. 1, the driver slightly raises the handle J so as to disengage the spur or click L and pushing back, by a consecutive movement, the rod I, causes the coffer to descend into the body of the vehicle, whence, after receiving the fare, it is withdrawn, by a reverse motion of the rod I and restored to its original position, in which it is secured by the click L and thus brought within ready reach of the driver's hand, through the hole C (Fig. 1).

Should it be found, in practice, that the swaying to-and-fro of the coffer interferes with its secure action, steadiness may be given, by adding to it one of the various devices, (or an equivalent therefor) known to mechanics as a parallel motion.

Various modifications of design or construction, of my said invention, might easily be suggested without affecting its essential character or principle.

The object of this mechanical coffer is obviously to provide a convenient method for passing money from passengers to drivers and vice versa, without the necessity on the part of the former, of standing in the vehicle.

What I claim as my invention and desire to secure by Letters Patent is—

The application and employment of a movable transmitting coffer, substantially such as hereinbefore described, in combination with omnibuses and other vehicles, when used in the manner, substantially and for the uses and purposes hereinbefore mentioned.

JOSEPH T. CURTIS.

In presence of—
DAN SEIGAS,
DANL. J. HART.